S. E. HALLEN.
VEHICLE SIGNAL.
APPLICATION FILED DEC. 1, 1919.
1,350,969.
Patented Aug. 24, 1920.
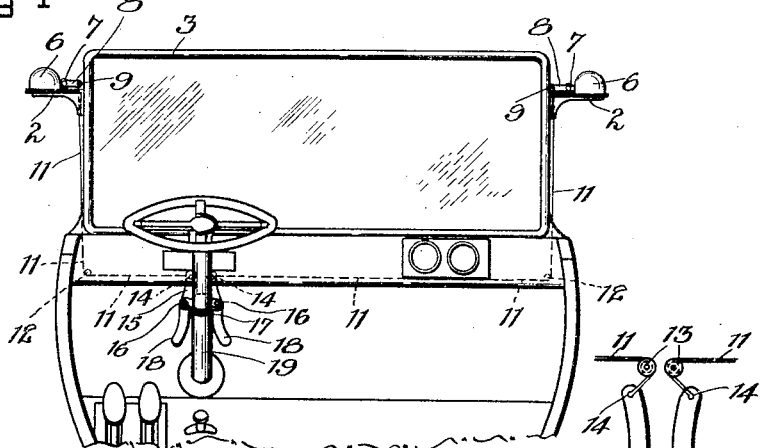
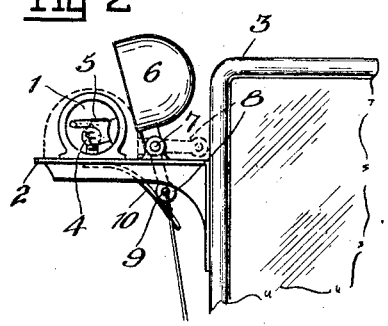
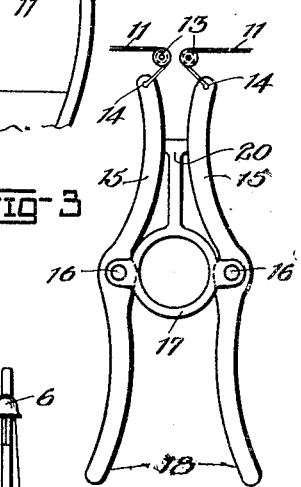
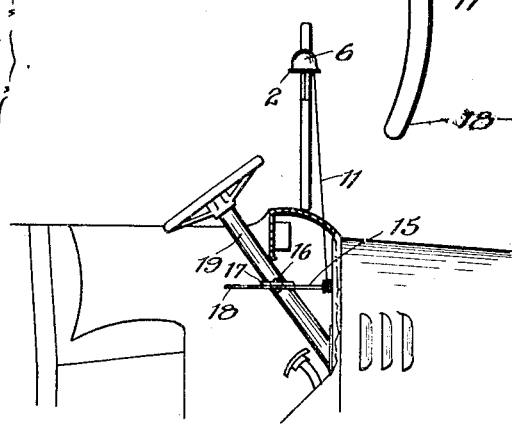
Inventor
Swan E. Hallen
By his Attorneys
Mason Fenwick & Lawrence

UNITED STATES PATENT OFFICE.

SWAN E. HALLEN, OF VANCOUVER, BRITISH COLUMBIA, CANADA.

VEHICLE-SIGNAL.

1,350,969.  Specification of Letters Patent.  Patented Aug. 24, 1920.

Application filed December 1, 1919. Serial No. 341,632.

*To all whom it may concern:*

Be it known that I, SWAN E. HALLEN, a subject of the King of England, residing at 767 Georgia St., Vancouver, in the District of British Columbia, Canada, have invented certain new and useful Improvements in Vehicle-Signals; and I do hereby declare the following to be a full, clear, and exact description of the invention, such as will enable others skilled in the art to which it appertains to make and use the same.

This invention relates to signals, and particularly to signals and appliances for signaling for vehicles on streets and roads, especially for automobiles.

The objects of the invention are to provide a simple and effective signal to be used on an automobile or other vehicle while being driven on public highways, to warn any other vehicle of the intention of the driver of the warning vehicle that he is about to make a turn to the right or left from the direct line in which he may be traveling.

A further object is to provide for such signal a form of transparent inclosure or lamp bulb provided with illumination for night, with a hand painted or impressed upon such transparent part, with a movable covering adapted to be readily dropped over such transparent body, and readily removed therefrom as desired by the driver of the vehicle.

I have illustrated my invention by accompanying drawings as follows:

Figure 1, shows front elevation of windshield and signals.

Fig. 2, shows enlarged detail of signal appliance.

Fig. 3, shows enlarged detail of operating levers,

Fig. 4, shows side elevation of windshield and signal.

Like numerals on the different figures represent like parts.

Under the regulations of most cities and also of the governments controlling traffic on public highways, particularly where automobile traffic is common, it is generally required that a driver of an automobile or other vehicle when intending to turn to either side shall signify such intention by holding out his hand on the side to which he expects to turn, to permit the following vehicles to regulate their actions and speed accordingly. In stormy weather it is important to keep the doors of the vehicle closed and thus it is difficult to extend the hand as required, and at nights the hands cannot readily be seen; and my invention is designed to provide mechanical means for giving the signals required, and by which the driver may give such signals without disturbing the curtains or doors, and the signals may be seen at night as well as by day.

Numeral 1, shows the transparent body which may be of glass or other suitable material, or may have a metal frame with transparent plates set therein at front and rear, this is affixed to a bracket 2 attached to side of vehicle or windshield 3 of an automobile, one on each side of the vehicle, an ordinary electric light bulb 4 may be placed within the body 1 for light at night, and a hand 5 or other symbol may be depicted upon the faces of the transparent plates or sides.

An adjustable cover 6 is attached by a hinge pin 7 to the bracket 2, with an extension 8 and eye 9 therein for a cord, and spring 10 tends to keep the cover 6 normally down over the body 1. The cord 11 is carried down and around a pulley wheel 12 to any suitable position as opposite the position of the knees of the driver of the vehicle, and the cord then carried to the central position of the vehicle in front of the driver, and passed around another pulley 13, thence to the eyehole 14 or end of the operating levers 15.

The levers 15 are attached by pivot pins 16 to a collar 17 on the steering post 19 of the automobile, and the free ends 18 of the automobile extend to position to be moved by the knees or hands of the operator.

Normally cover 6 is held down over the faces of the body 1 and so conceals the light by night and the symbol by day, and when the driver operating the vehicle intends to turn in either direction, he simply moves the respective lever 18 inward on the side to which he expects to turn, thus raising the cover 6 and exposing the symbol, thereby giving the required notice to all persons in front or behind that the vehicle will be turned in the said direction as so shown.

On the collar 17 is an extension with budders 20 to act as stops so that the outer ends of the levers will be held in suitable position with respect to their several covers.

I claim as new:

1. In a signal device for vehicles, a suitably marked translucent globe mounted on a bracket base, an opaque hood having a radial lever arm pivoted on said bracket base to one side of said globe, a spring attached to said base and engaging said lever arm to maintain said hood over said globe and in contact with said base, means to operate said lever arm and raise and remove said hood from over said globe, fully exposing the same to view from front, back and side, substantially as specified.

2. In a signal device for vehicles, the combination of a bracket base, a translucent globe or illuminable body suitably marked and mounted on said bracket base, to be readily discernible with internal illumination, means for internally illuminating said body, a hood adapted to cover said body in conjunction with said bracket base, and comprising an inverted cup with a radial arm, said arm being pivoted on said bracket with a free lever end, a spring engaging said free lever end of said arm to maintain said hood in a normally closed relation with said base, and an operating cord attached to said free lever end to raise said hood against the tension of said spring, substantially as specified.

3. A device of the class described, including a bracket adapted to be attached to the side portion of a wind shield of a motor vehicle, a translucent globe or illuminable body suitably marked and mounted on said bracket, an opaque hood having a radiator lever arm pivoted on said bracket to one side of the globe and adapted to normally cover the globe, a lever arm attached to said hood and adapted to operate through a slot in the bracket, a spring attached to the lower face of the bracket and bearing against said lever arm to retain the hood in its normal position in combination with pivoted levers attached to the steering post of the vehicle and means connecting said levers with the lever arm of the hood, as and for the purpose set forth.

4. In a signal device for vehicles, the combination with a bracket, of a translucent globe suitably marked and mounted on said bracket, a hood pivoted on said bracket and adapted to normally cover the globe, a lever arm connected with the hood and adapted to be operated through a slot in the bracket, a spring member attached to the under face of the bracket and bearing against the lever arm to retain the hood in its normal position, of pivoted actuating levers and means connecting said levers with the lever arm of the hood.

5. A device of the class described, including a supporting bracket having a slot therein, a translucent globe mounted upon the bracket, a hood pivoted on the bracket and adapted to normally cover the globe, a lever arm normally attached to the hood and adapted to operate through the slot in the bracket, a spring member adapted to engage the arm to retain the hood in its normal position, pivoted levers arranged at a point removed from the bracket and means connecting said levers with the lever arm of the hood, as and for the purpose set forth.

In testimony whereof I affix my signature.

SWAN E. HALLEN.